United States Patent [19]

Naso et al.

[11] Patent Number: 4,798,352

[45] Date of Patent: Jan. 17, 1989

[54] FILM REEL HAVING FILM-THREADABLE FILM-RETAINING CORE

[76] Inventors: Michael Naso, 2512 Leslie Street, Union, N.J. 07083; Frank Naso, 476 Clark Place, Union, N.J. 07083

[21] Appl. No.: 118,654

[22] Filed: Nov. 9, 1987

[51] Int. Cl.[4] .................... B65H 75/28; B65H 75/18
[52] U.S. Cl. .................... 242/74; 242/68.5; 242/71.8; 242/78.3
[58] Field of Search ............ 242/68.1, 68.3, 68.5, 242/71.8, 74, 78.3, 74.1

[56] References Cited

U.S. PATENT DOCUMENTS

| | | | |
|---|---|---|---|
| 2,954,941 | 10/1960 | Hultgren | 242/74 |
| 3,357,653 | 12/1967 | Otsuka | 242/74 |
| 3,361,380 | 1/1968 | Mizutani | 242/74 |
| 3,648,944 | 3/1972 | Fujiwaka et al. | 242/74 |
| 3,675,869 | 7/1972 | Grant | 242/74 |
| 3,743,204 | 7/1973 | Hertel | 242/68.5 |
| 3,982,709 | 9/1976 | Hertel | 242/74 |
| 4,540,134 | 9/1985 | Schankler | 242/74 |
| 4,629,140 | 12/1986 | LaCasse | 242/71.8 |

*Primary Examiner*—John Petrakes
*Attorney, Agent, or Firm*—William T. Hough

[57] ABSTRACT

In a preferred embodiment, there is a film reel having a film-threadable film-retaining core, the core containing a free-space for threading a mounting-end of a film to be wound on the reel, and across at least a portion of the core's free space there being a floor mounting the outer reel structure onto the inner core structure that is mountable on a driving spindle, with spaced-apart posts extending upwardly from the floor and the posts being spaced from each of the mounting spaces inside core walls and the space's inside surface of the outside walls of the core, with each of the posts anchored by an anchoring structure connected to the core's inside core structure, the upwardly extending posts having a large exaggerated arcuate surface providing a large surface area for contact with film threaded thereagainst. The spindle-mounting structure of the reel's core optionally may include a key-space formed by the inner core spindle-mounting structure. In preferred embodiments, the key-mounting structure extends into a space forming at least one of the connecting structures supporting one of the spaced-apart posts.

23 Claims, 11 Drawing Sheets

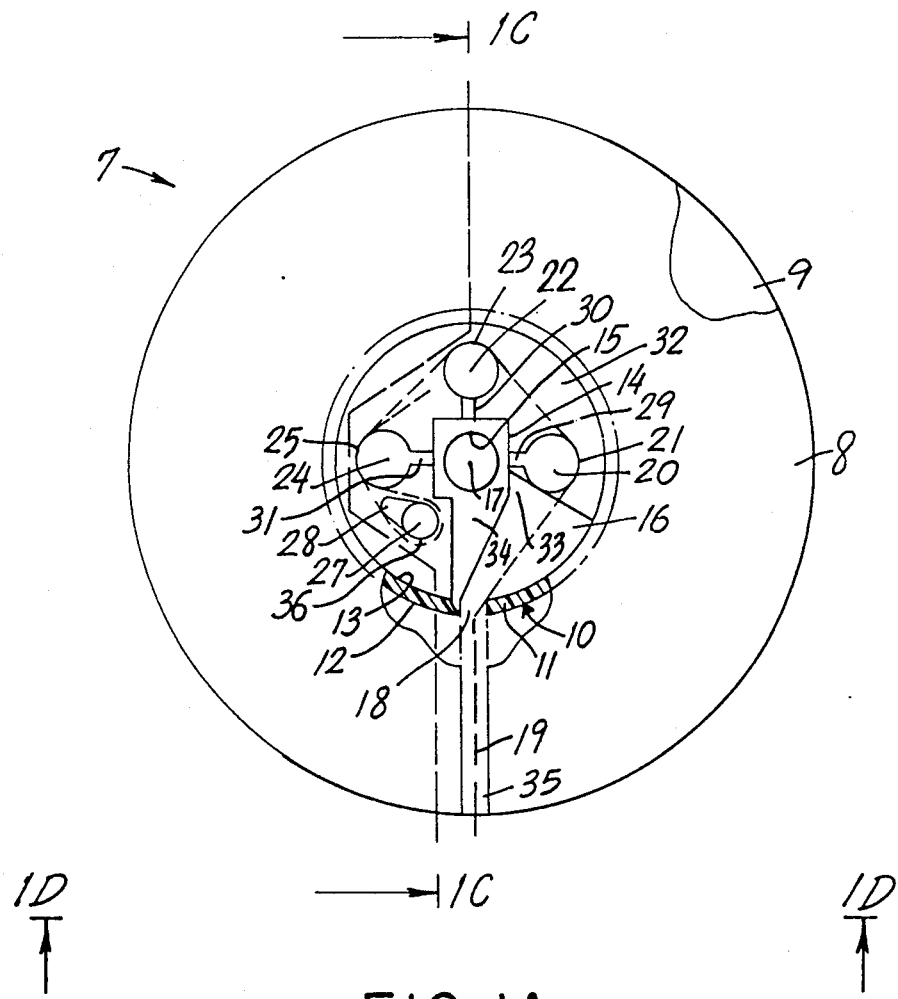
FIG. IA
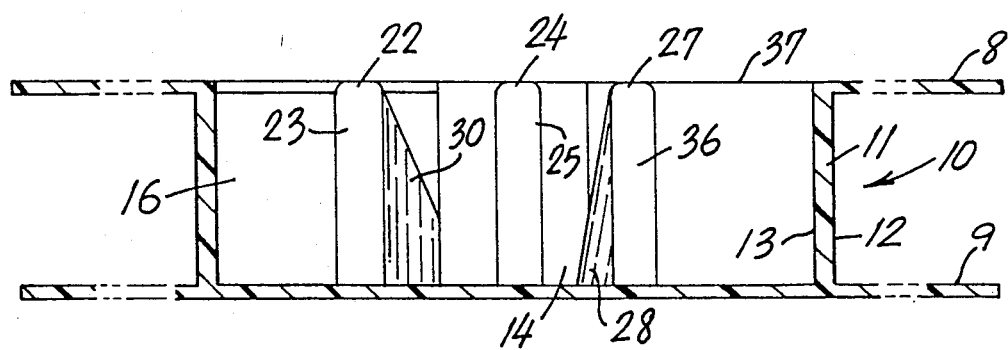
FIG. IC

006E
FILM REEL HAVING FILM-THREADABLE FILM-RETAINING CORE

BACKGROUND TO THE INVENTION

Prior to the present invention, there have existed a number of different types of film reels having various configurations in the core structures for the threading and retaining of the mountable end of a film to be reeled onto the reel. Typical ones of such patents are as follow. There is Taesler et al. U.S. Pat. No. 3,351,298 granted Nov. 7, 1967 in which a movable wedge-post may be turned within a threading space in order to wedge the film in a vise-like manner against an inner surface of the outer wall structure of the core. Also, there is the Hertel U.S. Pat. No. 3,743,204 in which the inner core has an outwardly extending projection against which all of the film being wound on the core presses thereagainst in order to secure the loose end of the film being wound onto the reel, being granted on July 3, 1973. Also there is Grant U.S. Pat. No. 3,675,869 granted July 11, 1972 which discloses a core's radially-extending wall having transverse spaced-apart grooves therein through which the end of the film is threaded through one and then sequentially through another one thereof. Also there is Fujiwara et al. U.S. Pat. No. 3,648,944 granted Mar. 14, 1974 which discloses a core free-space having a loose cylindrical member which when a film is wrapped therearound, serves to become wedged radially outwardly to prevent withdrawal of the film during use. Hultgren U.S. Pat. No. 2,954,941 granted Oct. 4, 1960 discloses a threading space having a single post therein through which film is threaded into the threading space around the reverse-direction post and back outwardly to be pressed by other reeled-on portions of the film against the free-end thereby locking the free-end against the outer-core surface of the reel. Also there is Hertel U.S. Pat. No. 3,982,709 that discloses a core-threading space having a reverse-direction upwardly extending post therein around which the film is threaded and carried in the reverse direction, in order to bind the surface thereof against the inner core outwardly facing wall. Also there is the Schankler U.S. Pat. No. 4,540,134 granted Sept. 10, 1985 that discloses a film reel having a film-threadable space in which it is required that inwardly-directed posts inwardly-directed from the inner surface of the outer core wall oppose squared right-angular points of the inner core wall, with small spaces defined therebetween, and having also an upwardly extending reverse-direction post such that the film is threadable through the free space and the narrow spaces and around the reverse-direction post and back again through the spaces adjacent the right-angle corners to thereby eventually anchor the film-end.

A number of problems and disadvantages arise from the structures and arrangements of the prior art typically represented by the above-noted prior art patents such as follow. Time is a valuable commodity for persons and companies constituting industry that utilize the film reels of the type to which this invention and the above-noted prior art are directed, such that narrow passages and complicated configurations and/or arrangements requiring time-consuming care and caution in the threading thereof are not only economically unfeasible, but practically worthless because no one in industry wants to nor will use them.

Also, a common misconception is that the film-end retaining ability of a core is directly proportional to a major degree to a number of different configurations and grooves through which the film has to be threaded. In fact, in actual practice, such does not prove to be true, the film end in a number of instances not being securely anchored—which in turn results in improper or faulty drawing or winding of the feed-film onto the film during the process of the reel-mounting of the film during its use from a feed-reel.

In order to achieve certain porported film-threading and film-anchoring advantages, there is considerable free space between inner and outer core wall structures, resulting in a common problem of likelihood of shearing of the outer reel structure from the inner core structure mounted on a winding spindle because of the major amount of torque imparted by the driven spindle driving the inner core structure, as compared to inertia of the outer reel structure that is pulling onto the reel the anchored film.

OBJECTS OF THE INVENTION

Objects of the present invention are directed to overcoming or avoiding one or more difficulties and/or disadvantages of the afore-stated prior art patents and technology thereof.

More particularly, another object is to obtain a novel film-mounting reel having a novel core-embodying reel embodying structure that enables speedy and secure anchoring of the free-end of the film to be wound on the reel.

Another object of the invention is to enhance the film-end anchoring characteristics of a core of a film-reel having large and spacious threading characteristics for the free-end of the film, and having concurrently a high resistance of torque by virtue of improved structure and strength of the core.

Another object is to obtain improved core structure making the film reel adaptable for use on a variety of diverse different shaped spindles.

Another object is to obtain one or more of the afore-mentioned objects, while concurrently allowing the use of a convention wedge as an anchoring mechanism alone or as an accessory, further anchoring the film end of the film to be wound onto the reel.

SUMMARY OF THE INVENTION

Broadly the invention may be defined as an improved film reel as an improved combination. The basic film reel to which the improvement is directed has a film-threadable film-retaining core with spaced apart outer and inner collars defining a free-space between the radially outwardly-positioned wall of the inside collar and the radially inwardly-positioned wall of the outside collar, the free-space communicating with a slot in the outer reel structure such that a film-end of a film to be wound on the reel may be threaded into the free-space of the core. The inner and outer collars of the core are interconnected by a floor on a lower side of the reel, and an opposite upper side of the reel being open with regard to a film free-end that must be threaded into the free-space with regard to the anchoring thereof. Also, between the core inner and outer collars, there is an interconnecting radially-extending wall (or collars's-anchoring floor) which anchors the outer collar to the inner collar, providing at least some minor degree of reinforcing strength to avoid the stripping of the outer collar from the inner collar during use as a result of excessive torque during the winding of the film onto the film reel as driven by a driven spindle on which the film reel would be mounted. The prior art film reel has a communicating slot connecting the threadable free-space with a space in which the film will be wound around the outer collar of the reel, the slot extending radially-outwardly the entire radial width of the reel's outer flange, enabling such maneuvering to be achieved. At the vertex or center of the core, there is a spindle-mounting space on the reel's lower surface, formed and shaped to receive and lock-in a driving spindle on which the reel will be driven in order to draw film onto the reel around the outer collar's radially outwardly-positioned outer surface. As a part of a combination for the improved combination invention, there are a plurality of wall structures spaced-apart from one-another and each extending radially outwardly a predetermined distance, each radially-extending wall of the plurality ending in a wall structure distal end leaving a narrow film-threading gap between that distal end and the outer collar's radially inwardly-positioned wall surface. The improved combination also includes a film-anchoring post structure within the free-space and the post extending upwardly from the floor, located sequentially after or beyond the plurality of wall structures, being adapted for wrapping a free-end of the film around the film-anchoring post sufficiently to reverse direction of the threading back toward the gaps from adjacent the distal ends of the plurality of wall structures. The film anchoring structure being spaced-away from each of the core-anchoring wall and the inner collar radially outwardly-positioned wall and the outer collar radially inwardly-positioned wall.

In a preferred improved combination, the spindle-receptacle structure forms a key-receiving receptacle structure and a key-receiving space thereof, with the key-receiving space opening into the spindle-receiving space, i.e. communicating therewith. In this preferred embodiment, additionally preferred, a plurality of consecutively substantially separate sides are sequentially formed by the inner collar radially inwardly-positioned wall surface, with the plurality of separate sides being joined and forming corners therebetween such that the joining sides of the key-receptacle receiving structure are formed on the opposite lower face of the reel's core structure. The last above-noted improvement with regard to the plurality of sides on the lower face of the core of the reel, may be and preferably is also an improvement on the above-noted improved combination devoid of such combination having or forming any key-receiving receptacle structure for receipt of a driving spindle. This is because need for a separate radially-extending key-space is obviated by preferably the adjoining sequentially consecutively-occuring sides of the plurality of sides of the inner collar radially inwardly-positioned wall surface; as a result, the plurality of consecutive separate sides form a multi-sided space structure which will mate with and drivably lock-in a multi-sided driving-spindle. Preferably the plurality of sequentially-arranged adjoining sides form a squared spindle-receiving space.

In another embodiment thereof, the adjoining sides are preferably shaped to form a triangular spindle-receiving space.

In another embodiment thereof, the adjoining sides form a pentagonal spindle-receiving space.

In another embodiment thereof, the adjoining sides form a hexagonal spindle-receiving space.

In the embodiment described-above as a part of the spindle-receiving structure there is formed a key-receiving space; and the spindle-receiving structure is shaped in a circular configuration to form a circular spindle-receiving space from which the key-receiving space communicates therewith.

With regard to the above-noted combination that includes a key-receiving space, relative to the above-noted preferred embodiment in which the inner collar radially outwardly positioned wall surface with the plurality of separate sides as a shaped-part thereof, note as follows. The inner collar radially positioned wall surface has a corresponding multi-sided driving-spindle threading-space located on an opposite reel-face, with the spindle and receptacle-space formed by consecutive spindle-space side-walls; these consecutive side-walls are substantially parallel with the multi-sided outer surface of the inner collar above-described. From a plurality of the sides of the multi-sided outer surface of the inner collar, there extend the above-described plurality of radially outwardly-extending wall structures each extending from an intermediate portion of one of the above-described plurality of sides—i.e., extending substantially radially outwardly from a point intermediate between opposite ends of the threading-space side. In the same or alternate embodiment, preferably the outer collar radially-inwardly positioned wall surface is shaped substantially concavely, relative to a center of the film reel. This is in order to critically provide that the outer collar radially outwardly-positioned wall surface does not readily contact a threaded film during the threading of the film-end in the film-threading space, adding ease and speed of threading.

In an alternate embodiment of the improved combination of the invention, in which the improved combination includes the above-described plurality of sequentially-occuring consecutive sides formed by the inner collar radially inwardly-positioned wall surface forming on the lower face the multi-sided spindle-receiving structure and space thereof receivable of a multi-sided driving spindle, in a further preferred combination therewith the plurality of wall structures each extend radially outwardly on the upper face of the reel from the inside collar, for a predetermined distance sufficient to and in order to form a film-threading gap between the distal end thereof and the outer collar radially inwardly positioned wall surface. In further combination with this embodiment, there is included the above-described film-anchoring post positioned sequentially after the plurality of radially-extending walls in order to form the reverse-direction mechanism for reversing direction of a threading of a film free-end. In this last-described embodiment, the plurality of separate sides formed on and by the inner collar radially positioned wall surface, form a plurality of separate corners, one corner between each of the sides thereby formed. It is substantially intermediate between each of these corners that each of the radially extending wall structures extends radially outwardly from the inner collar radially outwardly positioned wall surface. That is to say that each corner is formed by two of the adjoining sides of the inner collar radially outwardly positioned wall surface with the radially-extending wall extending from points intermediate between the corners thereby formed. In a further preferred embodiment of this last-described wall structure, there is formed on the lower face a key-receiving space formed between parallel walls constituting a part of the structure of one of the plurality of walls. As previously described, this key-receiving space communicates with the spindle-receiving space to thereby enable a spindle including a matable key to be mated with and locked into the reel's spindle-receiving and key-receiving spaces and thereby being drivable of the reel.

Preferably each of the plurality of radially-extending walls extends upwardly toward the upper face, extending upwardly from and anchored to the above-described collar's-anchoring floor.

As described for prior embodiments, this above last-described embodiment likewise may on its lower face have the spindle-receiving structure and space thereof shaped by the plurality of consecutive sides thereof, in a preferred square shape, or in a triangular shape or in a pentagonal shape or in a hexagonal shape. Likewise, there is present a key-receiving space as above-described, the spindle-receiving space may be circular in shape, as a novel improved combination. For the embodiments described in the above immediately two last paragraphs, the distal end portions of the plurality of radially-outwardly extending wall structures, likewise have radially-outwardly positioned convex surfaces in order that a major amount of frictional surface contact is made therewith when the film free-end has been threaded thereagainst such that the film free-end retaining characteristics of the improved combination are substantially enhanced and increased as a result of the additional and/or improved degree of frictional contact.

FIGURES

FIGS. 1A, 1B, 1C, and 1D, each illustrate diagrammatically different views of a common embodiment of the present invention. More particularly, FIG. 1A illustrates an elevation plan view of an upper face of a film reel of this invention, with partial cut-away of an outer flange of the reel. Also, there is a partial cut-away of an inward portion of the flange between a free-space of the core and a threading gap extending radially outwardly in the upper-face outer flange of the reel.

FIG. 1B diagrammatically represents and illustrates an elevation plan view of an opposite lower face of the embodiment of FIG. 1A, with partial cut-away of the lower outer flange and with a partial cut-away of an inner portion of the flange and of the floor.

FIG. 1C diagrammatically illustrates a view in cross-section as taken along line 1C—1C of FIG. 1A, as well as also taken along line 1C—1C of the embodiment of FIG. 4A.

FIG. 1D diagrammatically represents a view of each of FIGS. 1A through 6A, as taken along line 1D—1D.

Each of FIGS. 2A, 3A, 4A, 5A and 6A illustrate corresponding views to that of FIG. 1A, but of different embodiments. Likewise, each of FIGS. 2B, 3B, 4B, 5B, and 6B illustrate the same view as the view of FIG. 1B, but of different embodiments of the invention.

FIG. 2C diagrammatically illustrates a cross-sectional view as taken along line 2C—2C of each of FIGS. 2A, and 3A and 6A.

FIG. 5C diagrammatically illustrates a cross-sectional view as taken along line 5C—5C of FIG. 5A.

FIGS. 7A, 8A and 9A respectively diagrammatically illustrate elevation plan views of embodiments corresponding to and identical to the embodiment of FIG. 1A, except that the shapes of the inner collars and their corresponding radially inwardly and radially outwardly positioned walls are of triangular shapes, pentagonal shapes and hexagonal shapes respectively, such that the spindle-receiving spaces thereof are triangular, pentagonal and hexagonal respectively.

Likewise, the FIGS. 7B, 8B and 9B respectively diagrammatically illustrate the same inner core shapes as the corresponding FIGS. 7A, 8A and 9A, except the FIGS. 7B, 8B and 9B illustrating elevation plan views of the lower face thereof.

DETAILED DESCRIPTION

Figure 1B:
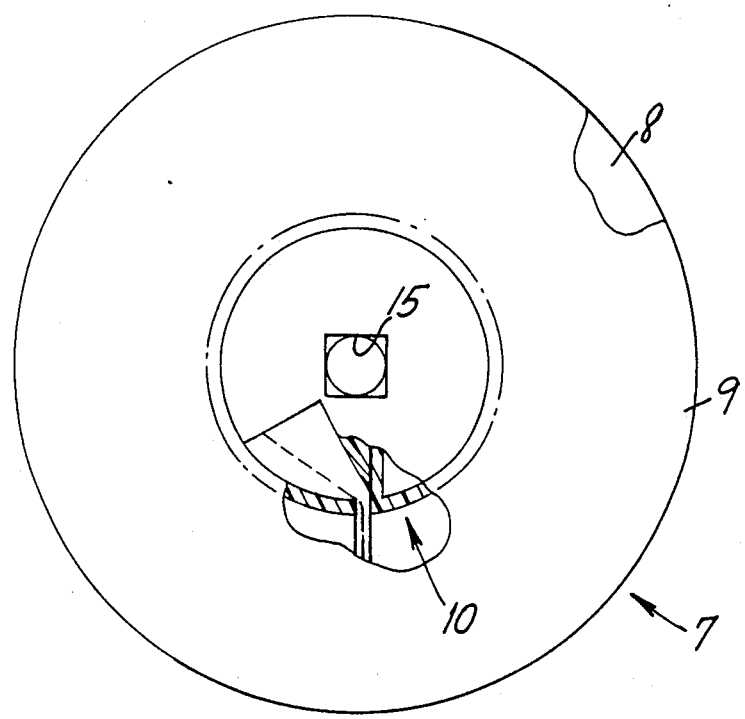

Because in the different embodiments of the invention as briefly discussed for the above-described invention, there are equivalent structures and elements thereof, corresponding indicia are used for corresponding elements of the different embodiments, to avoid redundancy and to improve understanding of the relationship of various embodiments to one-another.

It is to be understood that the film reel of this invention may be made out of any desired or conventional material, but typically and preferably is made out of plastic(s) conventionally used in the industry throughout past years. The heart of the invention lies in the film end-retaining features of the improved reel combination, not in the composition of the reel and/or core thereof.

With regard to FIG. 1A, there is disclosed the reel 7 having an upper flange 8 and a lower flange 9, and having an outer collar 10 inclusive of the outer collar wall structure 11 having the radially outwardly extending surface 12 onto which the film is wound, and having the inner wall surface 13 thereof. There is also disclosed the inner collar radially outwardly positioned outer surface 14, and the radially inwardly positioned surface 15. The radially inwardly positioned wall surface 15 circumscribes and forms the spindle-receiving receptacle space 17. The inner and outer collars are interconnected by the lower collars's anchoring floor 32 above which is defined a threading-space 16 through which a loose end of a film is threaded prior to reeling a film onto the film reel. As is the case with particular prior art reels, the floor 32 does not extend the entire distance of the threading space, but becomes terminated in the vicinity of the groove 18 that continues as groove 35 through which the free end of the film 19 is threaded. At the termination point of the floor 32 at the lower face of the reel, there is a through-space 33 that in the past has been typically utilized for insertion of a separate pin or key so as to lock a film into the core. This invention includes the presence or absence of that through-space as an option for the user to additionally use such prior art separate pin as an alternative to or together with other novel improved film-retaining advantages of the improved present invention. Such conventional pin or key is not illustrated herein, not constituting a part of the invention, although the inventive combination provides for the optional use thereof.

Accordingly a free-end of the film 19 may be threaded through the space 35, through the gap 18 and through the thread-space 16.

Extending upwardly from the floor 32, are separate radially outwardly extending walls 29, 30, and 31 of which the distal ends 20, 22, and 24, are at least arcuately formed distal ends thereof, having convex surfaces on the radially-outwardly faces thereof as convex surfaces 21, 23 and 25. The inner collar radially outwardly positioned wall 14 is formed in this embodiment in a square preferred shape, forming the consecutive sides between the squared corners thereof, and the respective radially-outwardly extending walls 29, 30 and 31 extend from intermediate portions of those consecutively occuring walls. Additionally there is the reverse-direction post 28 having a supporting wall 31 around which is shown the film 19 terminating in film-end portion 36 wrapped around reverse-of-direction post 27 and reverse-threaded in reverse-direction over the surface 25. The inner core structure of wall 14 is anchored to the outer core collar 10 by the interconnecting wall structure 34.

FIG. 1B illustrates the opposite face of the reel from that of FIG. 1A, illustrating the lower face of the reel, as previously described. Labeled elements of this Figure have been previously above-described.

FIG. 1C as previously noted illustrates a view as taken along line 1C—1C of FIG. 1, affording improved understanding of the side-view appearance of elements such as 22, 23, 24, 25, 27, 36, 30, 28, 14 and the like previously described, except for the open top space 37.

Figure 1D:
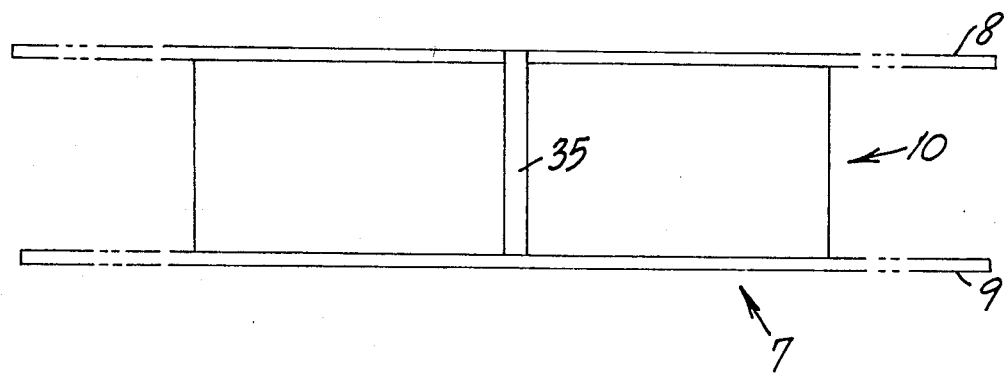

Likewise, FIG. 1D illustrates a different view of the reel as a whole, typically showing the appearance of the groove or slot 35 as it appears in the core. All indicia thereof have been previously described.

Figure 2A:
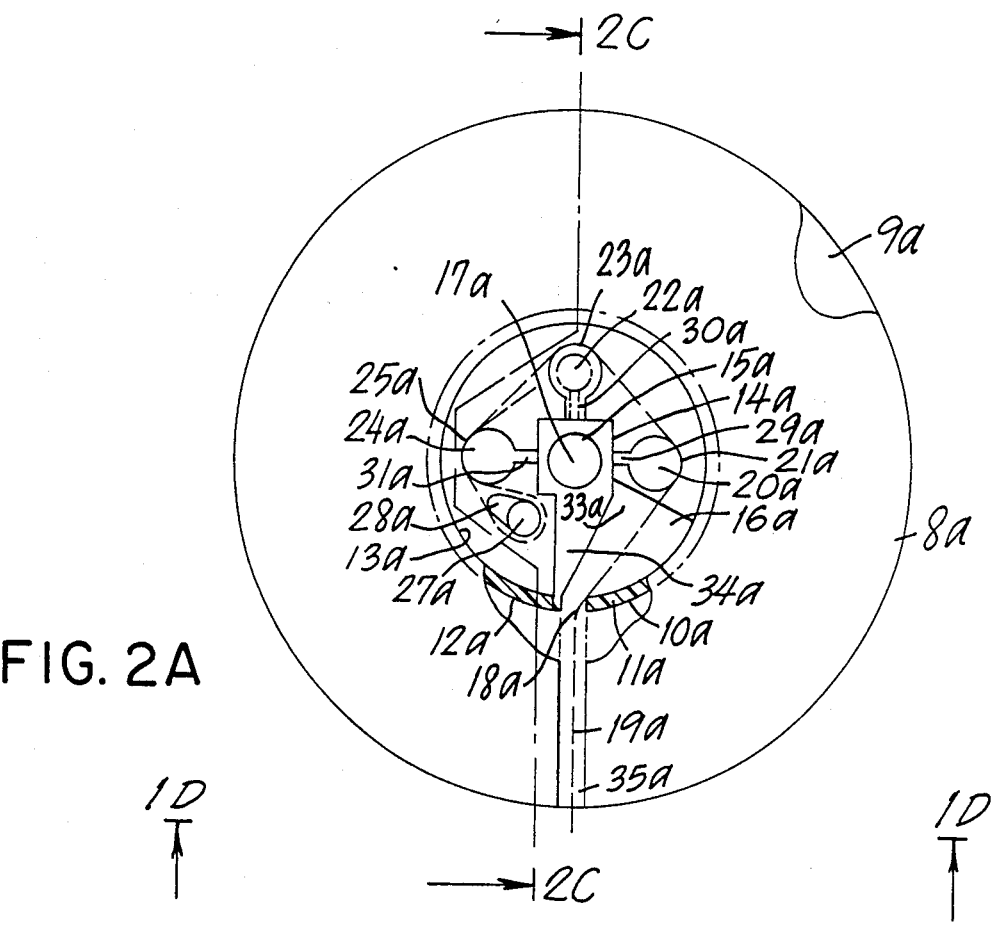
Figure 5C:
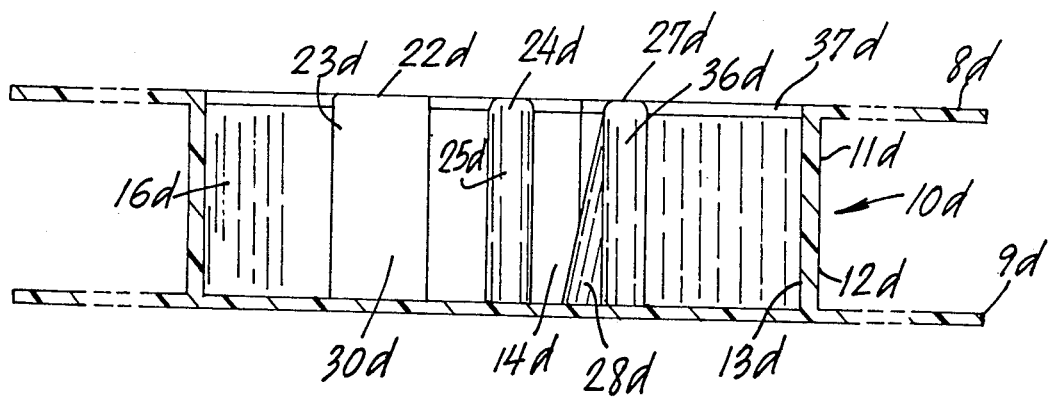

All indicia of FIG. 2A have been previously described. This embodiment has a thicker wall structure 30 embodying a key-space on the opposite side thereof—shown in phantom in this Figure.

Figure 2B:
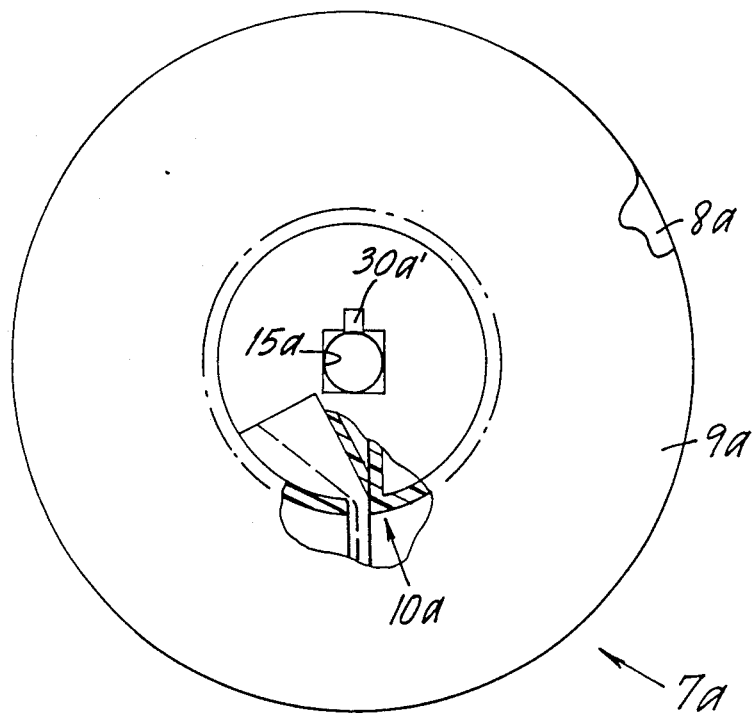

Except for the slot-space 30a', all indicia have been previously described for the FIG. 2B. For all remaining Figures, all indicia thereof have been previously described.

Figure 2C:
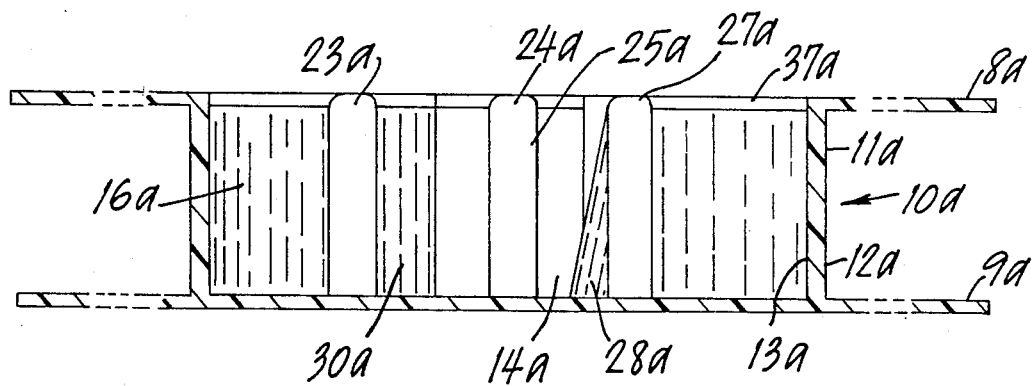

For that same embodiment of FIGS. 2A and 2B, FIG. 2C illustrates the full-height non-tapered wall 30a.

Figure 3A:
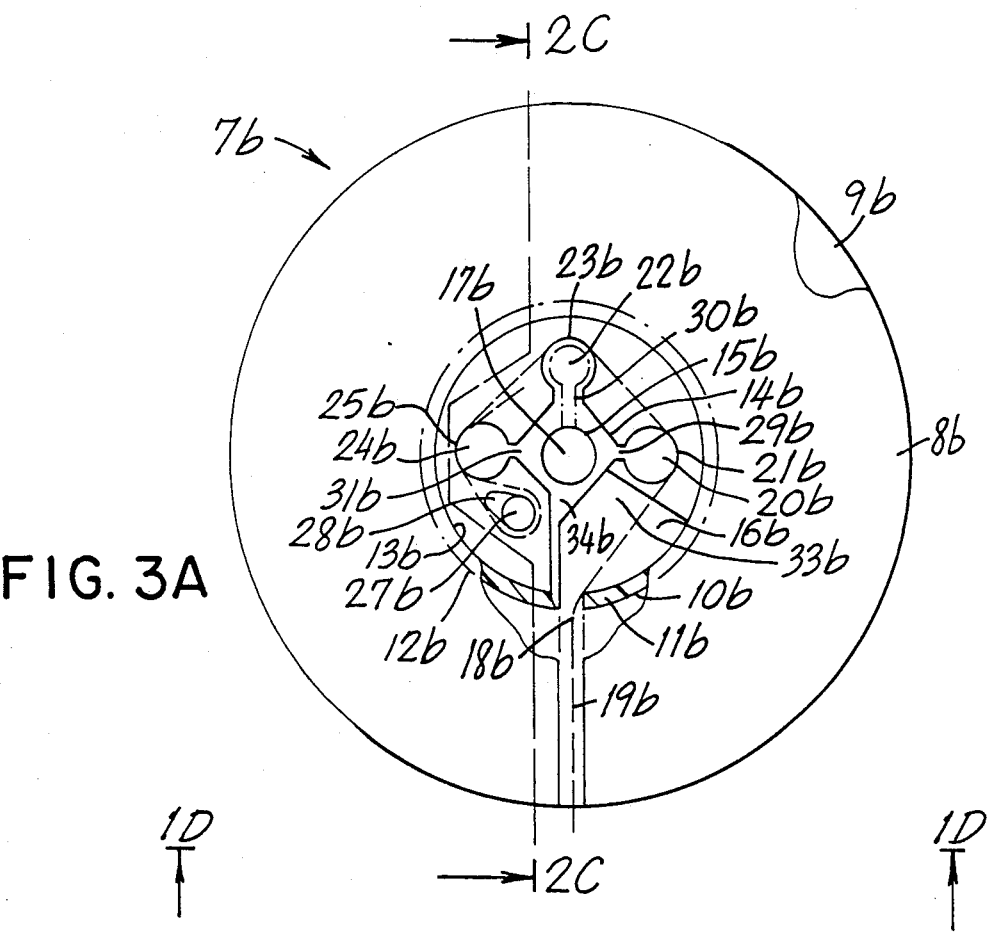

The embodiment shown in FIG. 3A illustrates the differently-positioned squared walls 14. For that same embodiment, for the opposite side of the reel as shown in FIG. 3B, there is illustrated the differently-positioned squared receptacle and keyspace 30b' that is not present in the embodiment of FIGS. 2A and 2B.

Figure 3B:
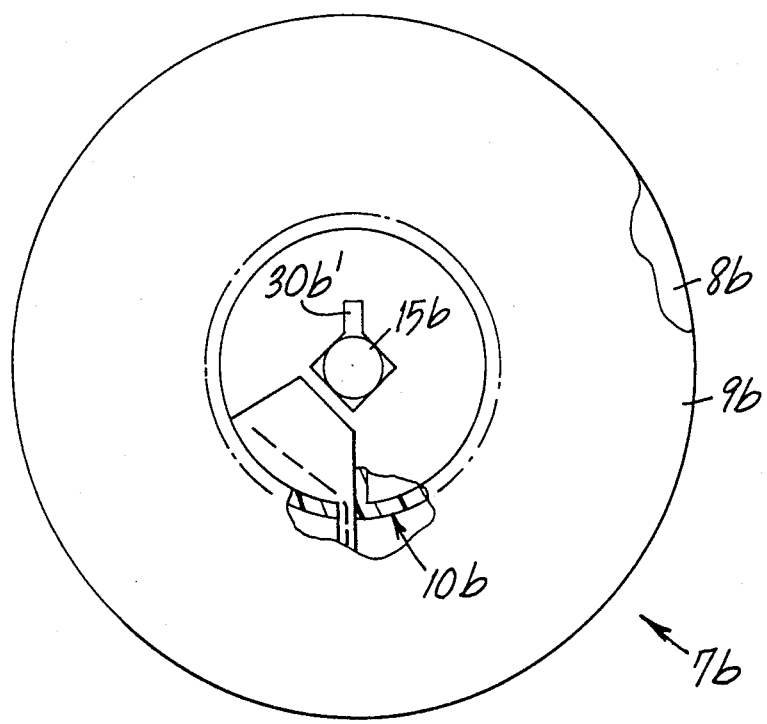
Figure 4A:
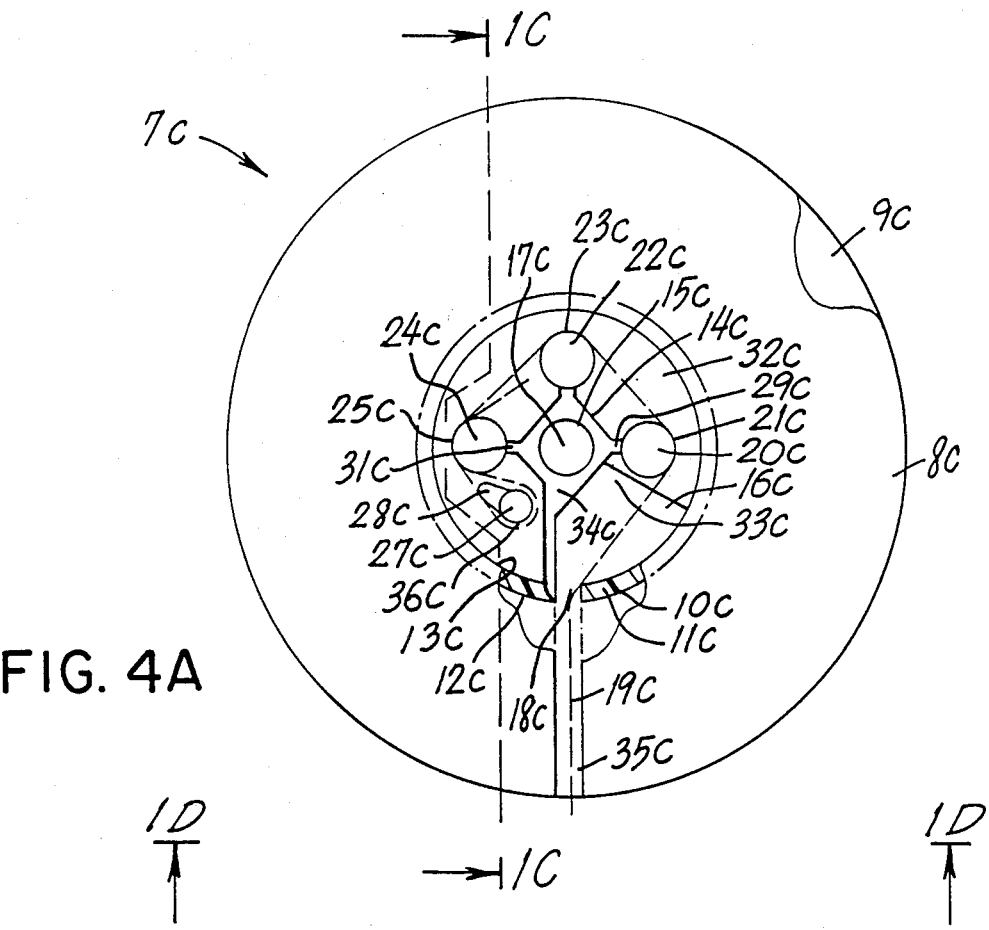
Figure 4B:
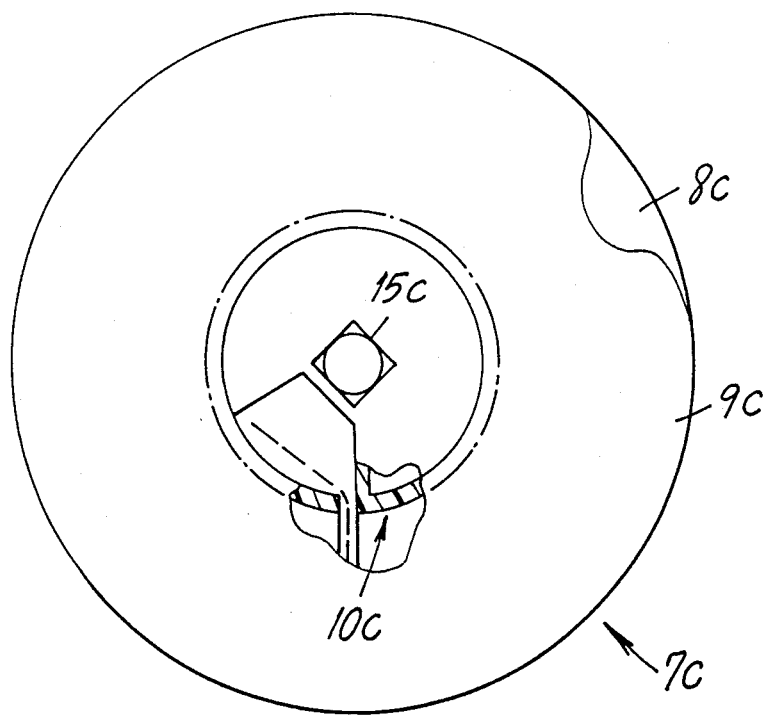

The embodiment of FIG. 4A differs from that of FIG. 1A, in the FIG. 4A embodiment having a structure the same as that of FIG. 3A, but having no keyspace embodied in its radially-outwardly extending wall(s), best illustrated in FIG. 3B.

Figure 5A:
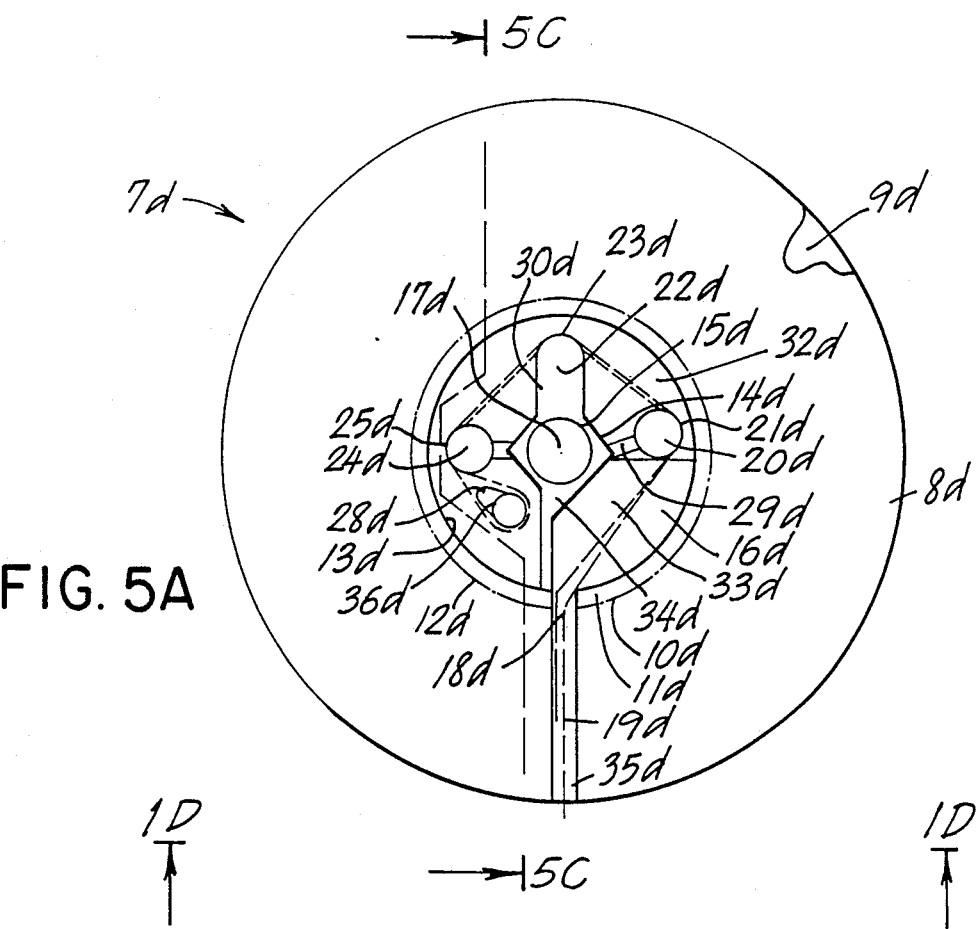
Figure 5B:
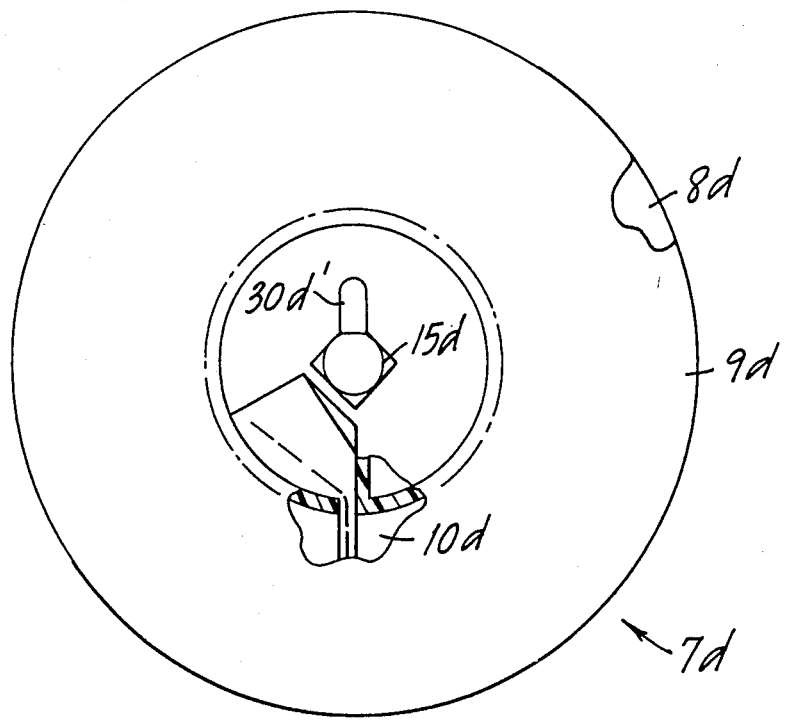

For the embodiment of FIG. 5A, the wall 30d is differently shaped and differently positioned, as compared to FIG. 1A illustration. Likewise, in FIG. 5B illustration of this embodiment, the key-space 30d' is differently shaped and positioned, as compared to the FIG. 2A illustration.

Figure 6A:
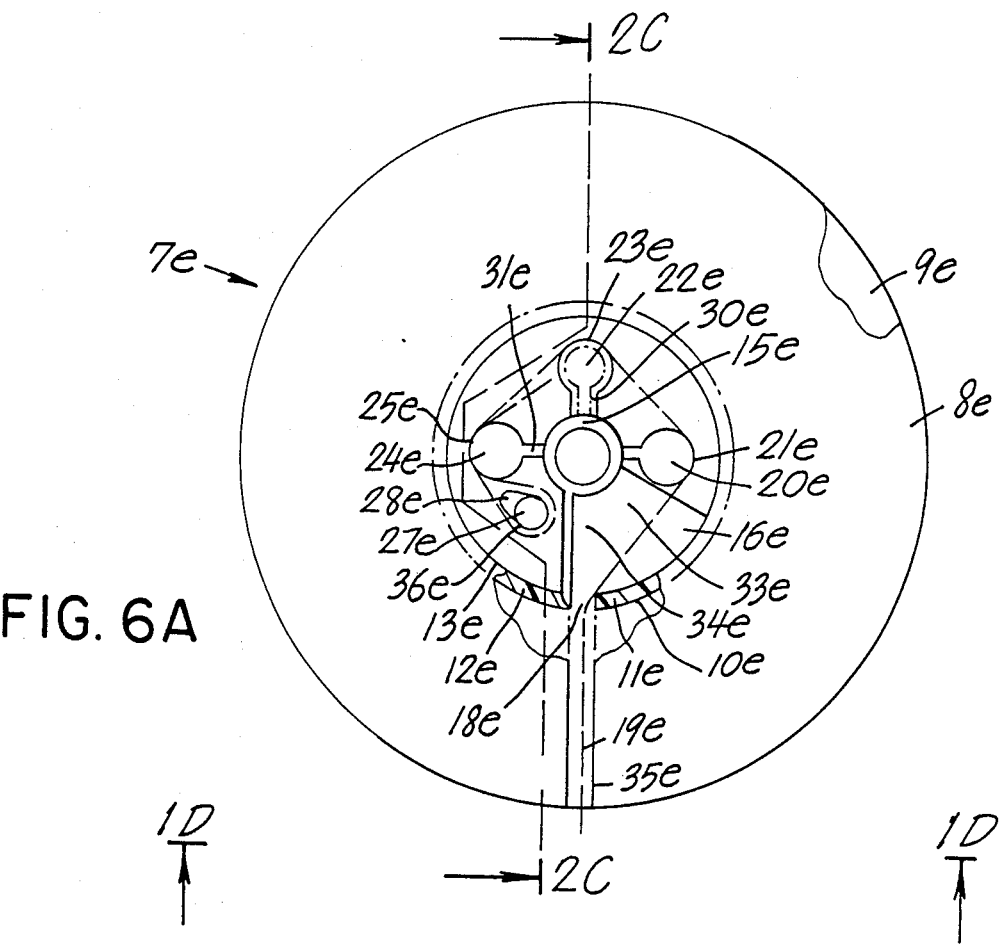
Figure 6B:
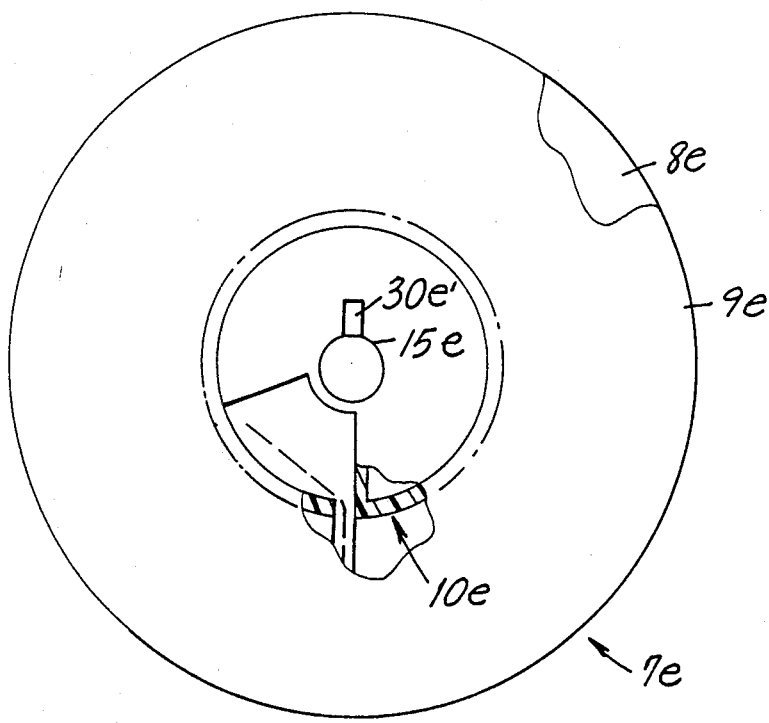

For the embodiment of FIG. 6A, there are rounded walls 14e; the opposite face illustrated in FIG. 6B shows the correspondingly rounded different shape and devoid of any multisided configuration and additionally having the key-space 30e' for this embodiment.

Figure 7A:
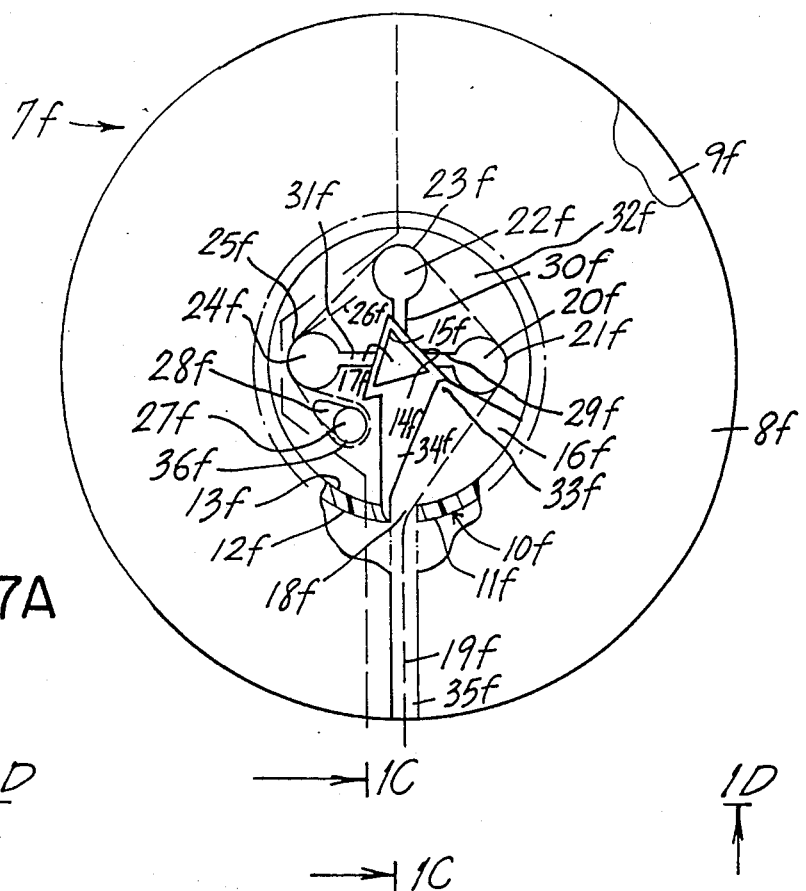
Figure 7B:
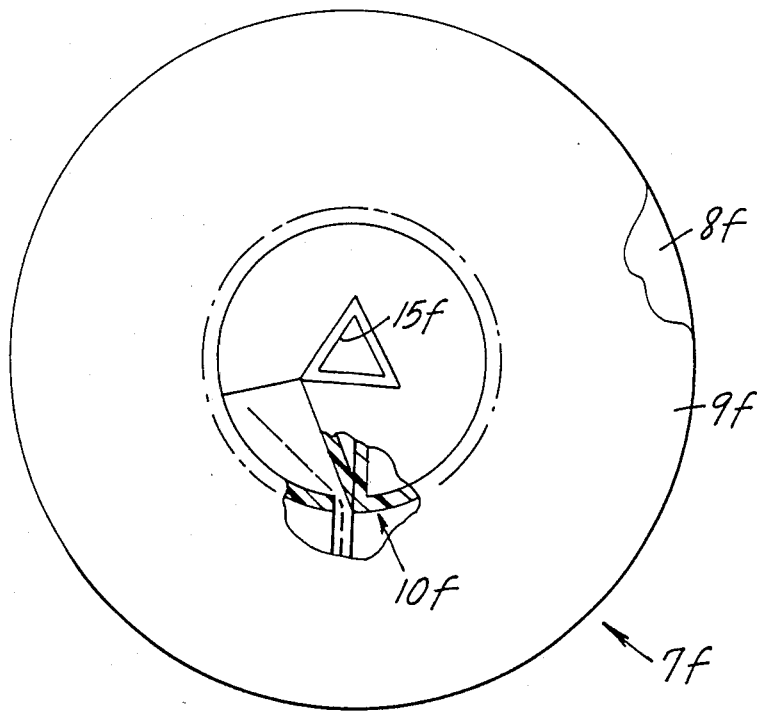

For the embodiment of FIG. 7A, there is illustrated the triangular walls 15f, and for the opposite reel-face of FIG. 7B, the triangular wall 15g.

Figure 8A:
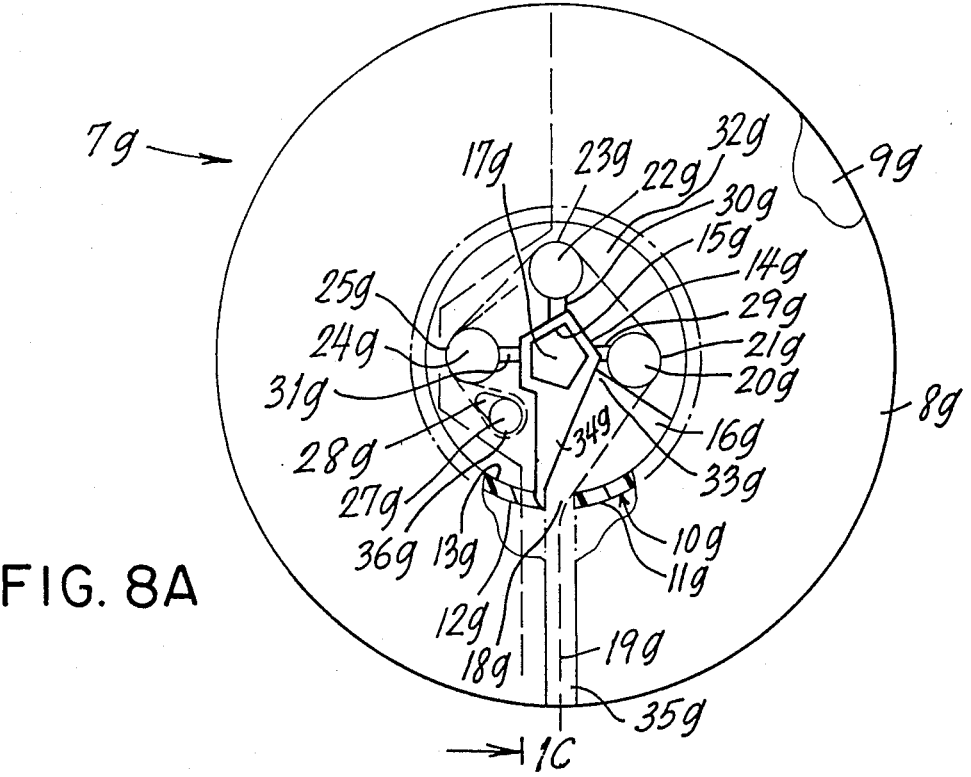
Figure 8B:
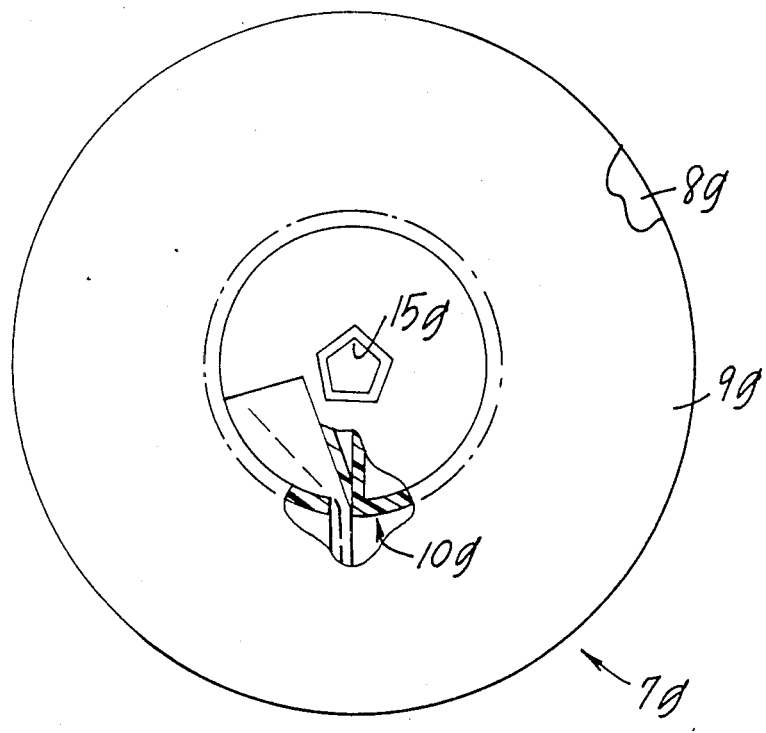

For the embodiment of FIG. 8A, the wall 14f is pentagonal, and on the opposite face, the wall 15g is pentagonal.

Figure 9A:
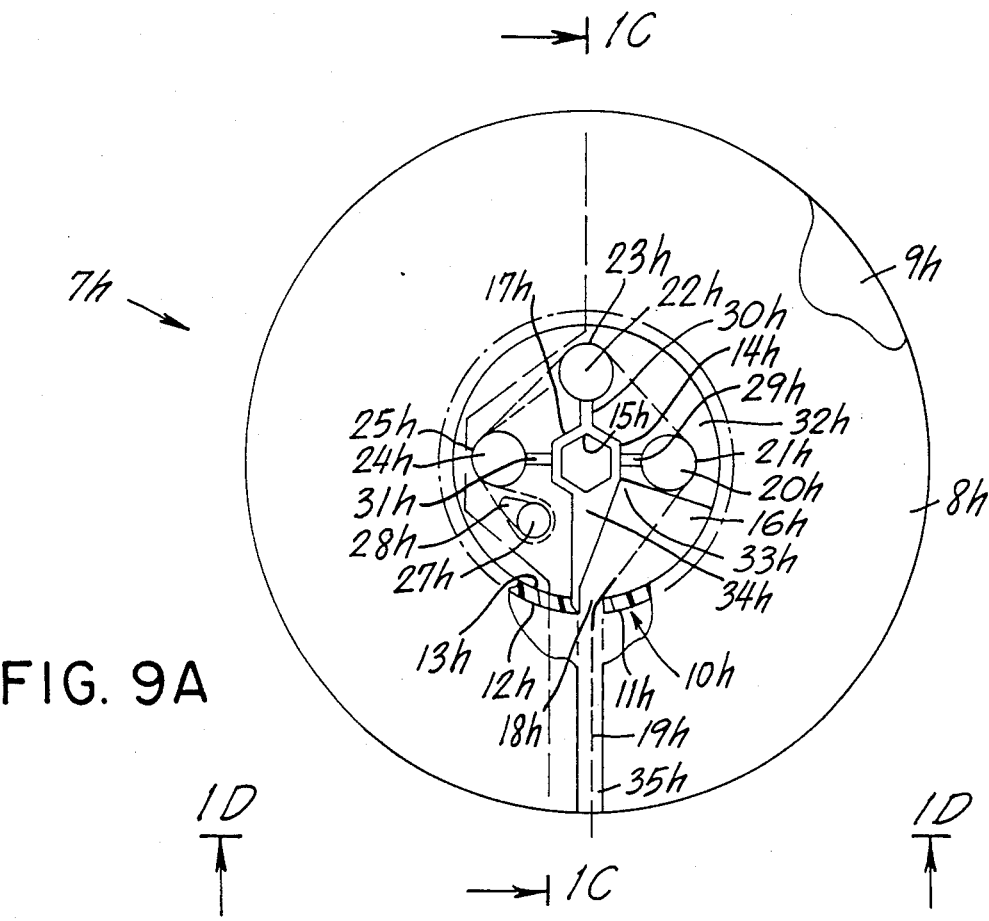
Figure 9B:
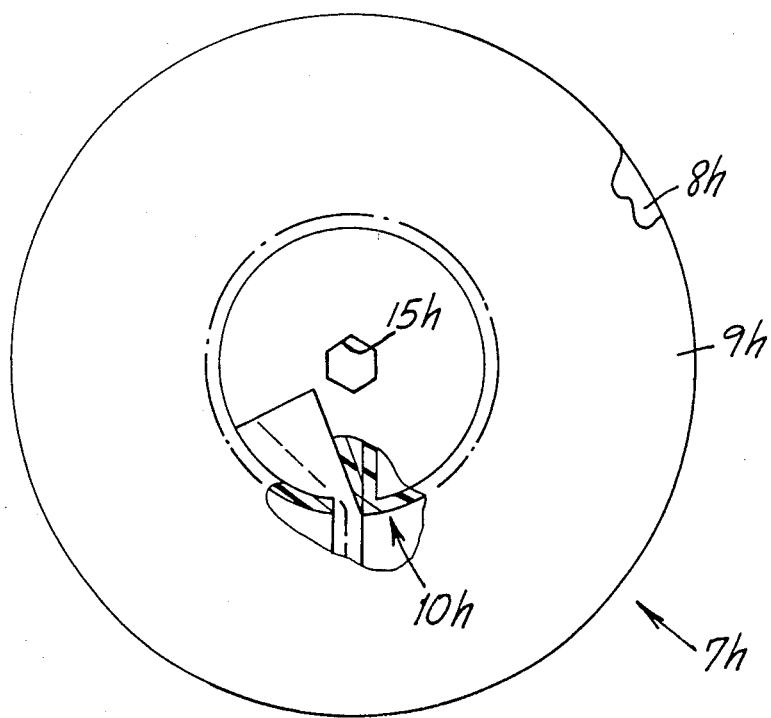

For FIG. 9A the wall 14f is octagonal, and on the opposite reel-face, the wall 15g is octagonal.

Otherwise, the embodiments typically illustrated in the FIGS. 7A 8A and 9A are illustrated as top plan views thereof that are otherwise identical to the embodiment of FIG. 1A, except as otherwise above-described, such as the above-described shapes of the inner collars 14f, 14g and 14h thereof and the radially inwardly positioned and radially outwardly positioned walls thereof, that is, the radially inwardly positioned walls for the spindle-receiving spaces 17f, 17g and 17h respectively. These non-circular configurations as spindle-receiving spaces are each drivable by spindles having corresponding shapes, or other shapes with a spindle key that becomes drivably engaged with the irregularly shaped walls.

It is within the scope and spirit of this invention, to make such variations and substitution of equivalents, as are apparent to a person of ordinary skill in this art.

I claim:

1. In a film reel having an upper face and an opposite-side lower face, in combination having a film-threadable film-retaining core (a) that has an outer collar with an outer collar radially-inwardly positioned wall-surface and with an outer collar radially-outwardly positioned wall-surface, (b) that has an inner collar with an inner collar radially-inwardly positioned wall-surface and with an inner collar radially-outwardly positioned wall-surface, defining a film-threading space between said outside collar's inside wall surface and said inside collar radially-outwardly positioned wall surface, (c) that has a collars's-anchoring floor connecting with at-least a major portion of each of the inner collar radially-outwardly positioned wall-surface and the outer collar radially-inwardly positioned wall-surface, (d) that has a radially extending core-anchoring wall radially-extending between and connecting-together said inner and outer collars, (e) a film-threading slot that extends-radially through said outside collar, and (f) the film-threading space extending from an open slot that extends-radially through said outside collar, the film-threading space extending substantially around said inside collar to terminate at said core-anchoring wall, and (g) said inner collar radially-inwardly positioned wall surface being a spindle-receptacle structure forming a spindle-receiving space of said opposite lower face; the improvement being in said core additionally as a part of said combination comprising: (1) said inner collar radially outwardly-positioned wall-surface including a plurality of wall structures each extending radially outwardly a predetermined distance to end as a wall structure distal-end defining a film-threading gap between said wall structure distal-end and said outer collar's radially-inwardly extending wall-surface; and (2) a film-anchoring post means for reversing direction of threaded film to be wrapped there-around to reverse the film-threading direction, said film-anchoring post means being located within said film-threading space extending upwardly from said collars's-anchoring floor, and said film-anchoring post means being positioned and spaced-away-from each of said core-anchoring wall, the inner collar radially-outwardly positioned wall surface and the radially-inwardly positioned wall surface.

2. The improvement according to claim 1, in which each said wall structure extends upwardly from and is connected to said core-anchoring wall.

3. The improvement according to claim 2, in which said spindle-receptacle structure further forms a key-receiving receptacle-structure and key-receiving space thereof which opens into said spindle-receiving space.

4. The improvement according to claim 3, in which said inner collar radially inwardly-positioned wall-surface, in the forming of said spindle-receptacle structure, includes a plurality of consecutive substantially separate sides joined at and forming corners therebetween as adjoining sides of said receptacle structure on said opposite lower face.

5. The improvement according to claim 4, in which said adjoining sides form a squared spindle-receiving space.

6. The improvement according to claim 4, in which said adjoining sides form a triangular spindle-receiving space.

7. The improvement according to claim 4, in which said adjoining sides form a pentagonal spindle-receiving space.

8. The improvement according to claim 4, in which said adjoining sides form a hexagonal spindle-receiving space.

9. The improvement according to claim 4, in which a plurality of said wall structure distal-ends form an upwardly extending post having a convex arcuate surface opposite and spaced-from said outer collar radially-inwardly positioned wall, each said convex arcuate surface being of a predetermined length and radius such that a major amount of surface contact thereof is made with a face of a film threaded thereagainst when film is threaded within said film-threading space.

10. The improvement according to claim 4, in which for each of said plurality of sides, said inner collar radially-outwardly positioned wall-surface has a corresponding threading-space side opposite to and substantially parallel with the side opposite thereto and in which at-least one of said plurality of wall structures extends from each threading-space side, extending substantially radially outwardly from a point intermediate between opposite ends of the threading-space side.

11. The improvement according to claim 4, in which for each of said plurality of sides, said inner collar radially-outwardly positioned wall-surface has a corresponding threading-space side opposite to and substantially parallel with the side opposite thereto, and in which said outer collar radially inwardly positioned wall-surface is substantially concavely shaped relative to a center of the film-retaining core such that portions of the outer collar radially inwardly positioned wall-surface do not contact a threaded film when a film is threaded through said film-threading space.

12. The improvement according to claim 3, in which said spindle-receptacle structure forms said spindle-receiving space in the form of a circle.

13. The improvement according to claim 1, in which said inner collar radially inwardly positioned wall-surface, in the forming of said spindle-receptacle structure, includes a plurality of consecutive substantially separate sides joined at and forming corners therebetween as adjoining sides of said receptacle structure on said opposite lower face.

14. The improvement according to claim 1, in which a plurality of said wall structure distal-ends form an upwardly extending post having an arcuate surface opposite and spaced-from said outer collar radially-inwardly positioned wall, each said arcuate surface being of a predetermined length and radius such that a major amount of surface contact thereof is made with a face of a film threaded thereagainst when film is threaded within said film-threading space.

15. In a film reel having an upper face and an opposite lower face, in combination having a film-threadable film-retaining core (a) that has an outer collar with an outer collar radially-inwardly positioned wall-surface and with an outer collar radially-outwardly positioned wall-surface, (b) that has an inner collar with an inner collar radially-inwardly positioned wall-surface and with an inner collar radially-outwardly positioned wall-surface, defining a film-threading space between said outside collar radially-inward positioned wall-surface and said inside collar radially-outwardly positioned wall-surface, (c) that has a collars's-anchoring floor connecting with at-least a major portion of each of the inner collar radially-outwardly positioned wall-surface and the outer collar radially-inwardly positioned wall-surface, and (d) a radially extending core-anchoring wall radially-extending between and connecting-together said inner and outer collars, (e) a film-threading open slot being formed in said outer collar with the open-slot being positioned substantially in juxtaposition to said core-anchoring wall, (f) the film-threading space extending from the film-threading open-slot and further extending substantially around said inside collar to terminate at said core-anchoring wall, and (g) said inner collar radially-inwardly positioned wall surface being a spindle-receptacle structure forming a spindle-receiving space on said opposite lower face; the improvement being in said core additionally as a part of said combination comprising: (1) on said upper face, at-least said inner collar radially inwardly-positioned wall-surface including a plurality of consecutive substantially separate sides joined at and forming corners therebetween as adjoining sides, concurrently forming on said lower face a multi-sided spindle receptacle means for receiving a multisided driving spindle revolvably drivable of the film reel; (2) at-least one of said adjoining sides intermediate between two of said corner sides including a wall structure extending radially outwardly from said inside collar a predetermined distance to end as a wall structure distal-end defining a film-threading gap between said wall structure distal-end and said outer collar's radially-inwardly extending wall-surface; and (3) a film-anchoring post means for reversing direction of threaded film to be wrapped there-around to reverse film-threaded directions, said film-anchoring post means being located within said film-threading space extending upwardly from said collars's-anchoring floor, said film-anchoring post means being positioned substantially in juxtaposition to and spaced-from said core-anchoring wall.

16. The improvement according to claim 15, including (4) another of said adjoining sides intermediate between a remaining other two of said corners, as a part of said spindle-receptacle structure, having a radially outwardly-extending structure forming a key-receiving space on said opposite face of said reel relative to said film-threading space on said upper face of the reel, the key-receiving space being formed by spaced-apart radially-extending key-receiving receptacle-walls that communicate with said spindle-receiving space.

17. The improvement according to claim 16, in which each of said plurality of said wall structures extends upwardly from and is connected to said core-anchoring wall.

18. The improvement according to claim 15, in which for each of said plurality of sides, said inner collar radially-outwardly positioned wall-surface has a corresponding threading-space side opposite to and substantially parallel with the side opposite thereto, and in which said outer collar radially inwardly positioned wall-surface is substantially concavely shaped such that portions of the outer collar radially inwardly positioned wall-surface does not contact a threaded film when a film is threaded through said film-threading space.

19. The improvement according to claim 18, in which said adjoining sides form a triangular spindle-receiving space.

20. The improvement according to claim 18, in which said adjoining sides form a pentagonal spindle-receiving space.

21. The improvement according to claim 18, in which said adjoining sides form a hexagonal spindle-receiving space.

22. The improvement according to claim 18, in which said spindle-receptacle structure forms said spindle-receiving space in the form of a circle.

23. The improvement according to claim 18, in which a plurality of said wall structure distal-ends form an upwardly extending post having a convex arcuate surface opposite and spaced-from said outer collar radially-inwardly positioned wall, each said convex arcuate surface being of a predetermined length and radius such that a major amount of surface contact thereof is made with a face of a film threaded thereagainst when film is threaded within said film-threading space.

* * * * *